United States Patent
Brodsky et al.

(10) Patent No.: US 8,160,443 B2
(45) Date of Patent: *Apr. 17, 2012

(54) CALIBRATION FACTOR FOR INTERFEROMETRIC OPTICAL SIGNAL-TO-NOISE RATIO MEASUREMENT

(75) Inventors: Mikhail Brodsky, Millburn, NJ (US); Mark David Feuer, Colts Neck, NJ (US); Lynn E. Nelson, Matawan, NJ (US); Jungmi Oh, Sayreville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 762 days.

This patent is subject to a terminal disclaimer.

(21) Appl. No.: 12/283,658

(22) Filed: Sep. 15, 2008

(65) Prior Publication Data

US 2010/0067904 A1    Mar. 18, 2010

(51) Int. Cl.
*H04B 10/08* (2006.01)
(52) U.S. Cl. .......................................................... 398/26
(58) Field of Classification Search .................... 398/25, 398/26; 356/51, 409
See application file for complete search history.

(56) References Cited

U.S. PATENT DOCUMENTS

| | | | | |
|---|---|---|---|---|
| 6,268,943 | B1 * | 7/2001 | Kang | 398/26 |
| 7,024,111 | B2 * | 4/2006 | Knox et al. | 398/25 |
| 7,499,173 | B1 * | 3/2009 | Brodsky et al. | 356/450 |
| 2004/0208517 | A1 * | 10/2004 | Simard et al. | 398/26 |
| 2009/0080882 | A1 * | 3/2009 | Cahill | 398/26 |
| 2010/0067903 | A1 * | 3/2010 | Brodsky et al. | 398/26 |
| 2010/0067904 | A1 * | 3/2010 | Brodsky et al. | 398/26 |

OTHER PUBLICATIONS

Nem Stefanovic et al., "Link Level Power Control of Optical Networks with Time-Delay", Proceedings of the 46th IEEE Conference on Decision and Control, New Orleans; LA, USA, Dec. 12-14, 2007.*

* cited by examiner

*Primary Examiner* — Jessica Stultz
*Assistant Examiner* — Tuan Nguyen

(57) ABSTRACT

Systems and methods are described that measure the OSNR of an optical channel. Embodiments provide OSNR measurement methods that distinguish the intensities of the coherent modulated signal from the incoherent noise intensity occupying the same optical band using a calibration factor $\zeta$.

4 Claims, 11 Drawing Sheets

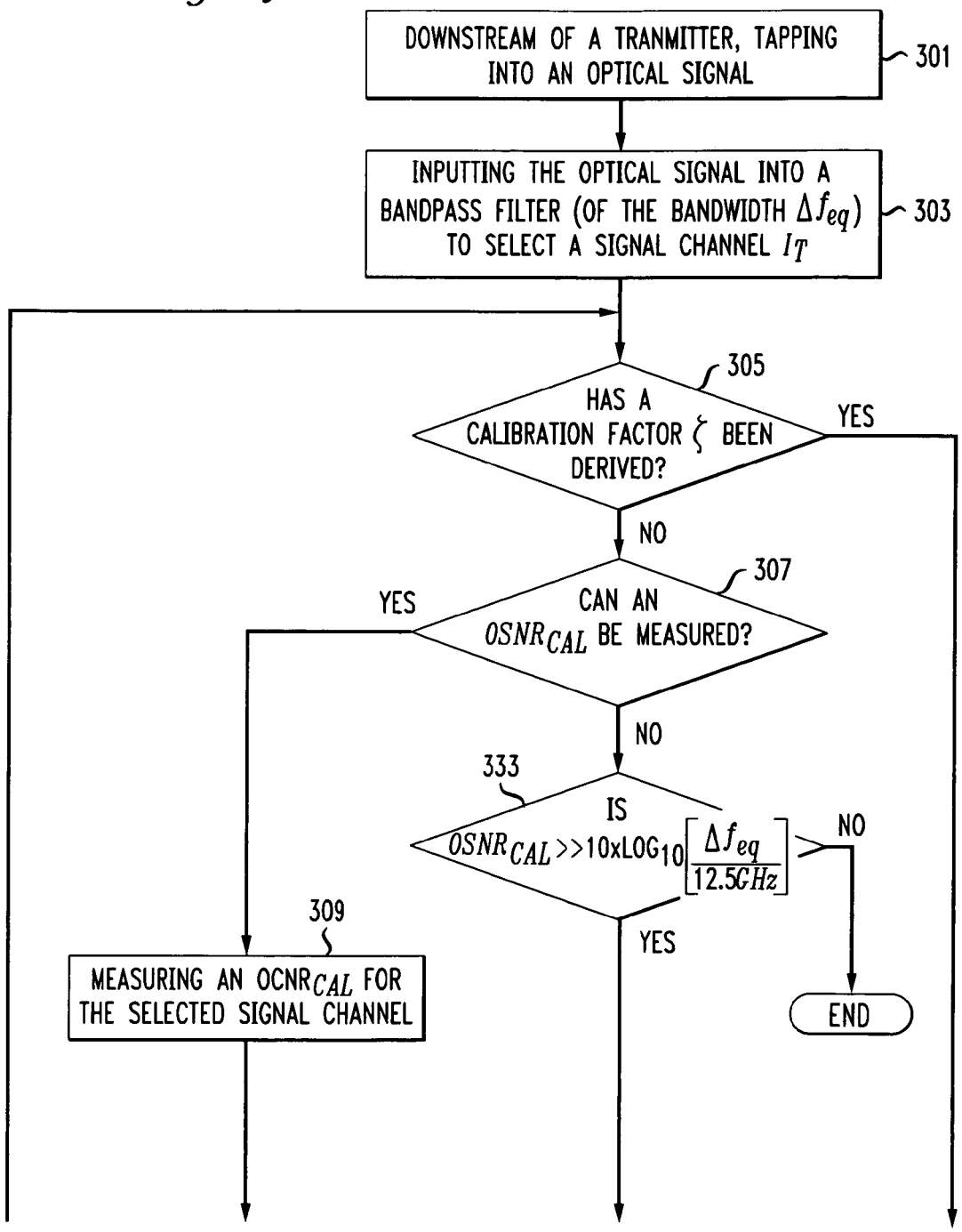

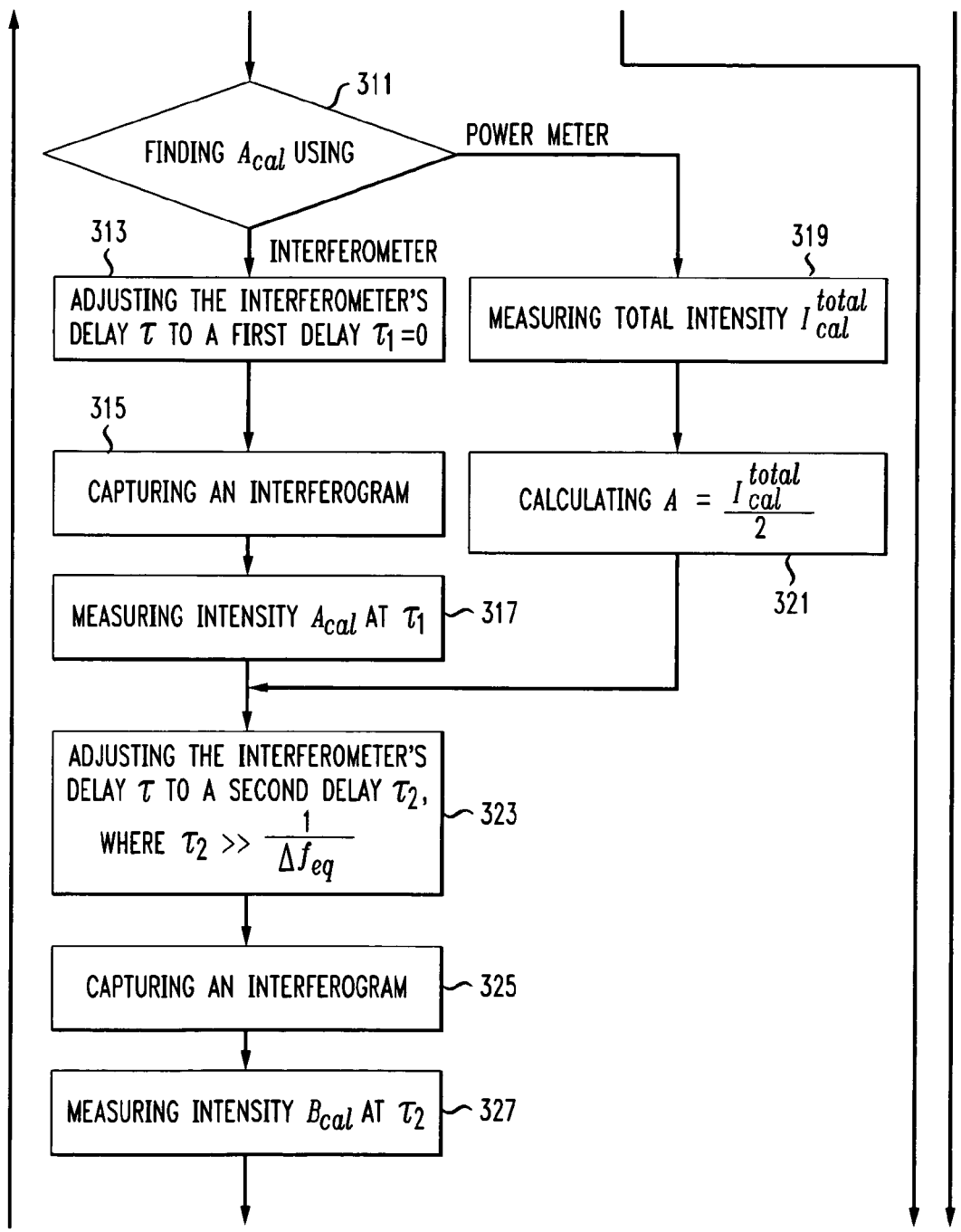

CALIBRATION FACTOR FOR INTERFEROMETRIC OPTICAL SIGNAL-TO-NOISE RATIO MEASUREMENT

BACKGROUND OF THE INVENTION

The invention relates generally to measuring the quality of an optical signal transmitted in an optical network. More specifically, the invention relates to systems and methods that measure an optical signal channel's signal-to-noise ratio using an interferometer in conjunction with a derived calibration factor $\zeta$.

In high-speed optical networks based on Reconfigurable Optical Add-Drop Multiplexers (ROADMs) which are used to build dynamically reconfigurable Wavelength Division Multiplexing (WDM) networks, each signal channel may traverse through different routes, optical amplifiers, and add-drop filters. As a result of these different paths, noise levels of adjacent signal channels may vary. Inline optical filters used for demultiplexing the signal channels inside the ROADMs also suppress noise in-between the channels.

While ROADM-based networks are more economical, they present new measurement challenges for optical monitoring. An optical signal-to-noise ratio (OSNR) is the key performance parameter in optical networks for predicting the Bit Error Rate (BER) of a system. Typically, an Optical Spectrum Analyzer (OSA) is used to measure OSNR.

The International Electrotechnical Commission (IEC) defines the standard for measuring OSNR using a linear interpolation method. This method is based on the averaging of the noise levels to the left and right of a channel bandwidth peak leading to the out-of-band OSNR result.

Using the linear interpolation method (out-of-band measurement) gives no indication of the noise present at the actual channel wavelength, possibly resulting in an incorrect OSNR value. This direct spectral measurement using tunable filters cannot distinguish between coherent signal power and incoherent noise power. It must rely on baseline measurements at signal-free wavelengths, but such baseline wavelengths may not be present in networks with optical add/drop functions. Acquiring the true OSNR value requires an in-band OSNR measurement.

To measure the true OSNR, it is important to gain access to the in-band noise inside the optical transmission band of the ROADM filters. Current approaches that employ an in-band noise measurement are shoulder methods using software-based solutions with a conventional OSA and polarization diversity detection using limited polarization nulling techniques.

The shoulder method is based on the assumption that there will be a hump on either side of the optical signal channel peak indicating the noise shape of the optical filter. The noise is measured at this hump. In high-speed optical networks, the bandwidth of the optical signal will almost be as large as the filter bandwidth leading to a very smooth transition between the noise and the signal. In ROADM-based networks, multiple ROADMs are cascaded, leading to a narrowing of the filter shape and making it difficult to detect a hump for accurate noise measurement.

Another in-band OSNR measuring technique is based on a polarization nulling principle. An optical transmission signal channel comprises an arbitrary polarized light, whereas the Amplified Spontaneous Emission (ASE) noise comprises only non-polarized light. Employing an optical polarizer in the light path will either block or pass the optical signal depending on the input signal State of Polarization (SOP). A polarization splitter separates the input signal into two orthogonal polarization states suppressing the polarized transmission signal and passing the non-polarized noise. However, in WDM systems, the SOP of the optical signal varies from channel to channel. A polarization splitter provides a fixed SOP. The suppression of the polarized transmission signal depends on the matching of the SOP between the input signal and the polarization splitter. The suppression can therefore vary from channel to channel.

The shoulder method is inaccurate when measuring the in-band noise floor in high-speed ROADM-based networks. Polarization nulling technique is similarly unreliable, particularly when noise is partially polarized. Neither method is desirable to measure a true OSNR.

What is desired are systems and methods that measure the OSNR of a signal channel with high accuracy under all conditions, independent of data rate and modulation format.

SUMMARY OF THE INVENTION

The inventors have discovered that it would be desirable to have systems and methods that measure the OSNR of a signal channel. Embodiments provide an OSNR measurement that distinguishes the coherent modulated signal power from the incoherent noise power that occupies the same signal channel bandwidth. To determine an accurate OSNR, embodiments derive a calibration factor $\zeta$.

One aspect of the invention provides a method for obtaining a calibration factor $\zeta_{known\ OSNR}$ for use in signal channel optical signal-to-noise ratio (OSNR) calculations. Methods according to this aspect of the invention include measuring an $OSNR_{cal}$ for the signal channel, inputting the signal channel into an interferometer, adjusting the interferometer's time delay $\tau$ to a first delay $\tau_1$, measuring intensity $A_{cal}$ at $\tau_1$, adjusting the interferometer's time delay $\tau$ to a second delay $\tau_2$, measuring intensity $B_{cal}$ at $\tau_2$, and calculating the calibration factor $\lambda_{known\ OSNR}$ using intensities $A_{cal}$ and $B_{cal}$, and $OSNR_{cal}$.

Another aspect of the invention provides a method for obtaining a calibration factor $\zeta_{known\ OSNR}$ for use in signal channel optical signal-to-noise ratio (OSNR) calculations. Methods according to this aspect of the invention include measuring an $OSNR_{cal}$ for the signal channel, inputting the signal channel into a power meter, measuring the signal channel total intensity, calculating an intensity $A_{cal}$ from the measured total intensity, inputting the signal channel into an interferometer, adjusting the interferometer's time delay $\tau$, measuring intensity $B_{cal}$ at $\tau$, and calculating the calibration factor $\zeta_{known\ OSNR}$ using intensities $A_{cal}$ and $B_{cal}$, and $OSNR_{cal}$.

Another aspect of the invention provides a method for obtaining a calibration factor $\zeta_{high\ OSNR}$ for use in signal channel optical signal-to-noise ratio (OSNR) calculations. Methods according to this aspect of the invention include inputting the signal channel into an interferometer, adjusting the interferometer's time delay $\tau$ to a first delay $\tau_1$, measuring intensity $A_{cal}$ at $\tau_1$, adjusting the interferometer's time delay $\tau$ to a second delay $\tau_2$, measuring intensity $B_{cal}$ at $\tau_2$, and calculating the calibration factor $\zeta_{high\ OSNR}$ using intensities $A_{cal}$ and $B_{cal}$.

Another aspect of the invention provides a method for obtaining a calibration factor $\zeta_{high\ OSNR}$ for use in signal channel optical signal-to-noise ratio (OSNR) calculations. Methods according to this aspect of the invention include inputting the signal channel into a power meter, measuring the signal channel total intensity, calculating an intensity $A_{cal}$ from the measured total intensity, inputting the signal channel into an interferometer, adjusting the interferometer's time delay τ, measuring intensity $B_{cal}$ at τ, and calculating the calibration factor $\zeta_{high\ OSNR}$ using intensities $A_{cal}$ and $B_{cal}$.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIGS. 3, 3A, 3B, 3C, 3D and 3E is an exemplary method.

DETAILED DESCRIPTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having," and variations thereof herein is meant to encompass the items listed thereafter and equivalents thereof as well as additional items.

The terms "connected" and "coupled" are used broadly and encompass both direct and indirect connecting, and coupling. Further, "connected" and "coupled" are not restricted to physical or mechanical connections or couplings.

It should be noted that the invention is not limited to any particular software language described or that is implied in the figures. One of ordinary skill in the art will understand that a variety of alternative software languages may be used for implementation of the invention. It should also be understood that some of the components and items are illustrated and described as if they were hardware elements, as is common practice within the art. However, one of ordinary skill in the art, and based on a reading of this detailed description, would understand that, in at least one embodiment, components in the method and system may be implemented in software or hardware.

Embodiments of the invention provide methods, systems, and a computer-usable medium storing computer-readable instructions for determining the OSNR of signal channels propagating in optical networks using an interferometer as the optical power acquisition means. The interferometer delays $\tau_n$ distinguish between a coherent optical signal and an incoherent noise occupying the same signal channel bandwidth. Components of the invention may be enabled as a modular framework and/or deployed as software as an application program tangibly embodied on a program storage device. The application code for execution can reside on a plurality of different types of computer readable media known to those skilled in the art.

Figure 1:
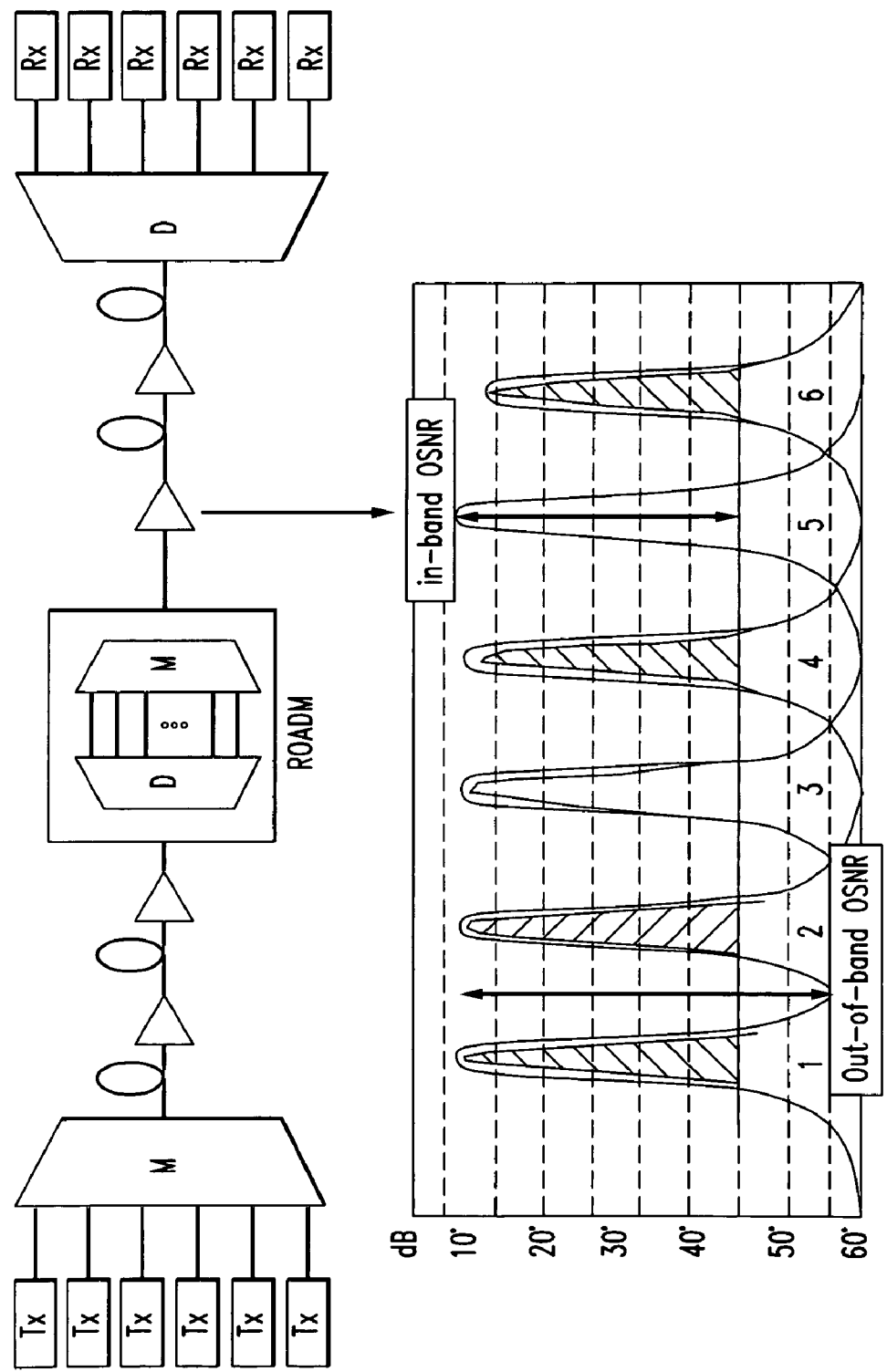
FIG. 1 is an exemplary optical network.

FIG. 1 shows an exemplary optical network that comprises an optical multiplexer (M), an optical demultiplexer (D), a ROADM, and optical fiber coupling the multiplexer to the ROADM and coupling the ROADM to the demultiplexer. Six signal channels are shown input to the multiplexer's transmitters (Tx). At the ROADM, the six channels may pass through and continue to the demultiplexer's receivers (Rx) and be output. A plot corresponding to the spectra of the six channels present in the optical fiber downstream of the ROADM is shown acquired by an Optical Spectrum Analyzer (OSA).

Inferometry is the technique of using the pattern of interference created by the superposition of two or more waves to diagnose the properties of the waves. The instrument used to interfere the waves together is an interferometer.

A single incoming beam of light is split into two identical beams by a partially silvered mirror. Each beam travels a different path before they are recombined at a detector. The difference in the distance traveled by each beam (path difference) creates a phase difference between the two beams. The introduced phase difference creates an interference pattern, or interferogram, between the initially identical waves. If a single beam has been split along two paths, then the phase difference is diagnostic of anything that changes the phase along the paths. If the two paths differ by a whole number (including 0) of wavelengths, there is constructive interference and a strong signal at the detector. If they differ by a whole number and a half wavelength (e.g., 0.5, 1.5, 2.5, ...) there is destructive interference and a weak signal. The effect of the interference is to alter the ratio of the light which heads for the detector and the remainder of the light which heads back in the direction of the source.

Figure 2:
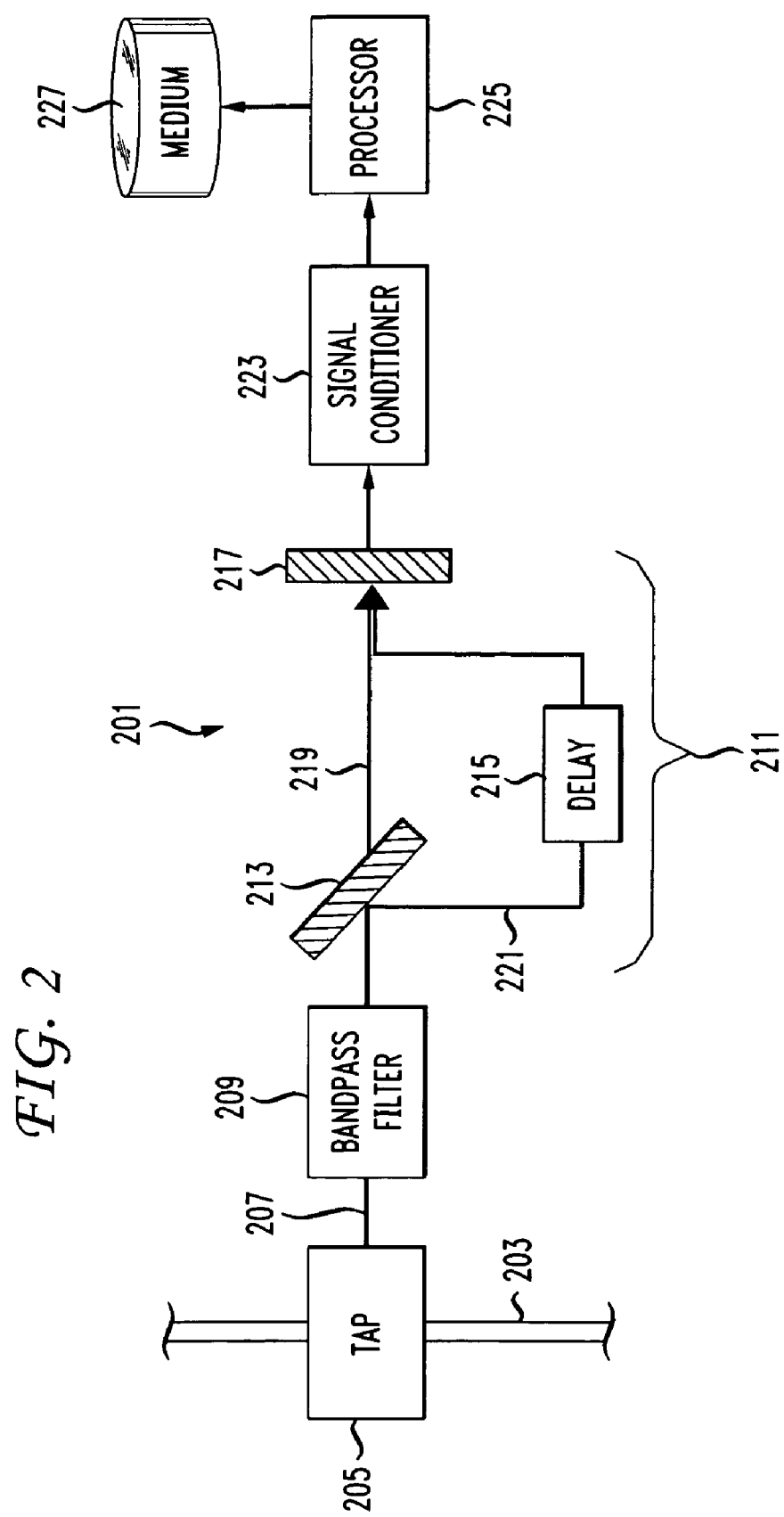
FIG. 2 is an exemplary system architecture.
Figure 3:
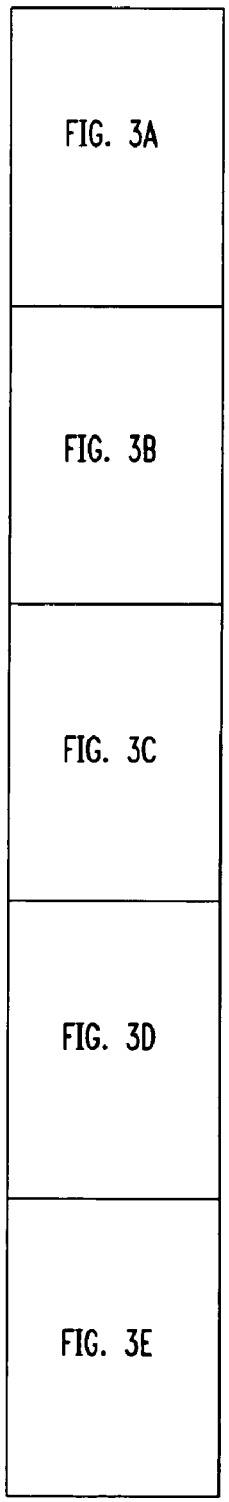
Figure 3C:
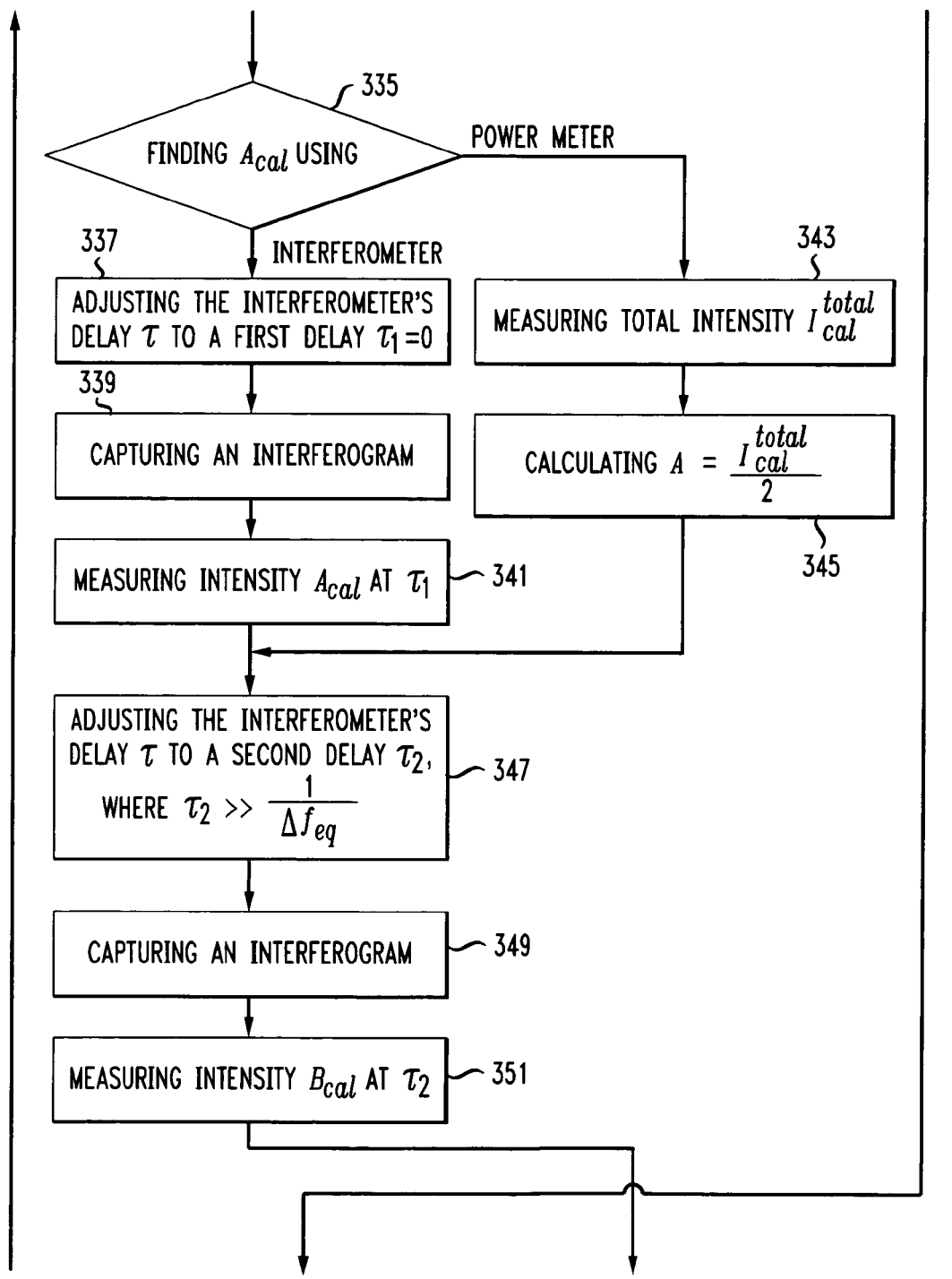
Figure 3D:
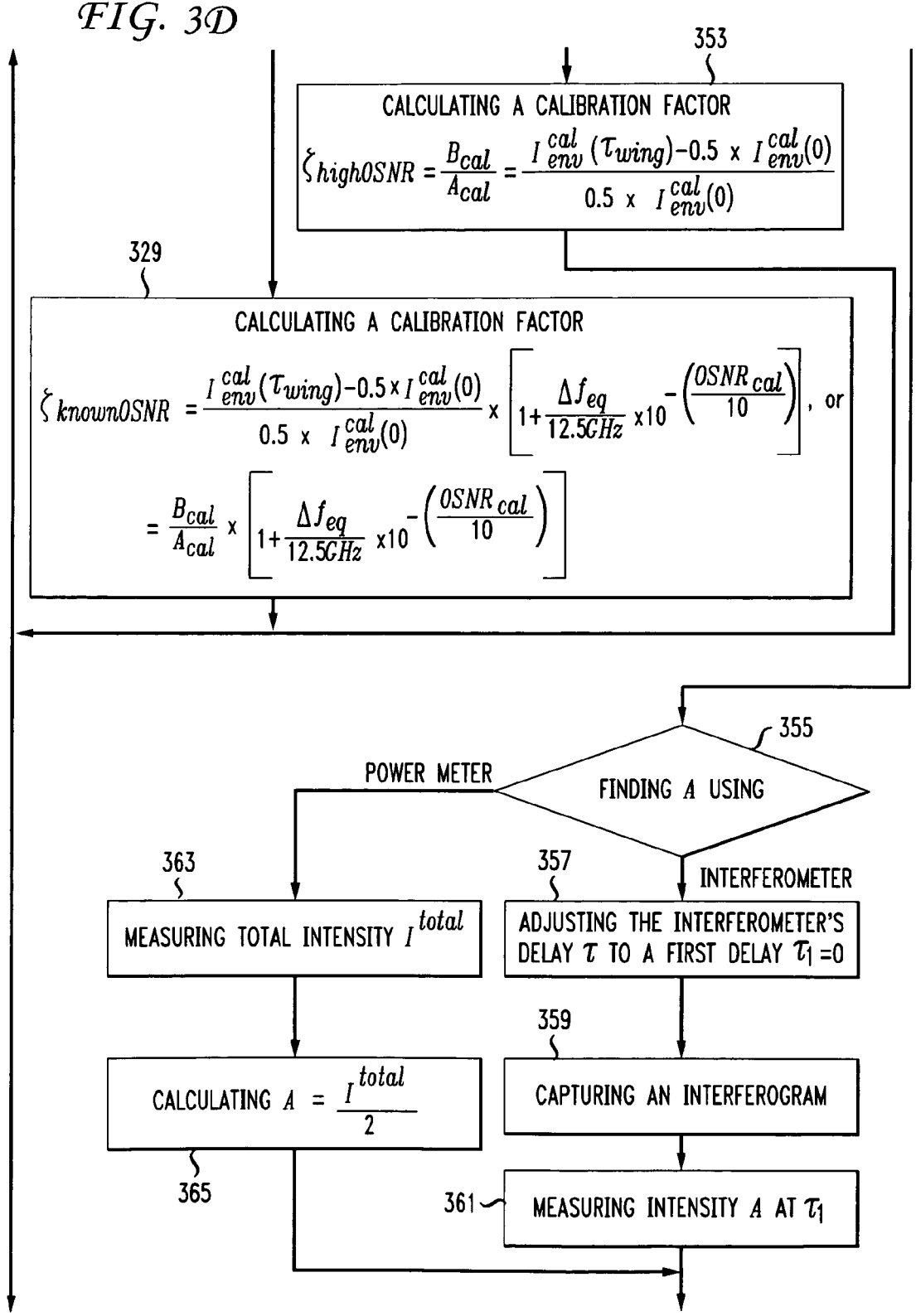
Figure 3E:
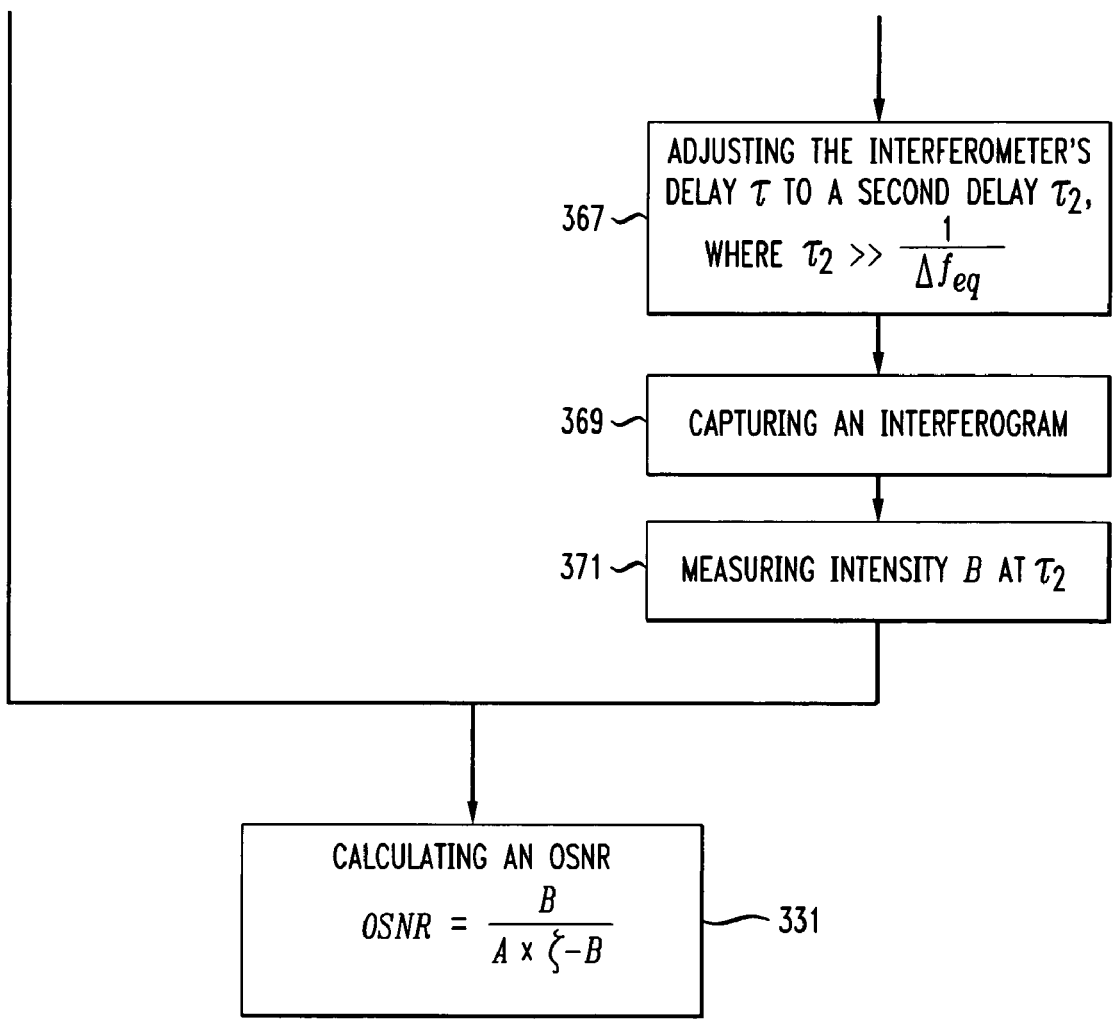

FIG. 2 shows a system 201 according to one embodiment of the invention. FIGS. 3, 3A, 3B, 3C, 3D and 3E show a method. The system 201 monitors optical signal channels transmitted in an optical transmission medium 203 such as an optical fiber and includes a tap 205 coupled to the optical fiber 203 for accessing one or more signal channels. The tap 205 may be a partially silvered mirror or other similar device for re-routing a small percentage of the light signal in the fiber 203 to form a tapped beam 207.

The tapped beam 207 is coupled to a variable optical bandpass filter 209. The bandpass filter 209 is configured to select each signal channel out of a plurality of signal channels transported in the fiber 203. The bandpass filter 209 output is coupled to an interferometer 211 that may include a splitter 213, a delay means 215 and a photodetector 217. The splitter 213 may be another partially silvered mirror for forming two beams from the filtered beam. Embodiments use a Michelson interferometer, but other interferometers may be used.

A first portion 219 of the filtered beam travels directly to the detector 217. A second portion 221 of the beam travels through the delay means 215 for introducing a delay τ into the beam 221. The delay means 215 may be a length of optical fiber or planar wave guide providing a fixed, known delay.

Other means known in the art, such as thermo-optic techniques or a free space moving mirror, may be used to introduce an adjustable delay into the beam 221.

The beams 219, 221 combine either constructively or destructively on the surface of the detector 217 and are processed by a signal conditioner 223 coupled to the detector 217. The recombined beams form a pattern on the detector 217 that is a function of the interferometer delay τ, as well as an intensity function of the characteristics of the tapped beam 207, as described above. If the tapped beam 207 is a combination of a coherent modulated signal and incoherent noise, then intensity output at larger interferometer delays will be close to that of the coherent modulated signal alone. Additional intensity output measured at zero delay (τ=0) may thereby be attributed to incoherent noise.

A processor 225 receives and processes the intensity measurement data from the signal conditioner 223. In one embodiment, the processor 225 is a component of a computer (not shown). In addition to the processor 225, the computer may include memory, a reader for reading computer executable instructions on computer readable media, a common communication bus, a communication suite with external ports, a network protocol suite with external ports and a graphical user interface, as is well known in the art.

The processor 225 includes or is connected to one or more computer readable media 227, such as a hard or floppy disk in a disk drive, a magnetic tape in a tape drive, a nonvolatile programmable ROM chip such as an EPROM, or volatile computer memory.

The computer readable medium 227 contains instructions that, when executed by the processor, cause the processor to compute a numerical value using the light output intensity measurement. That numerical value represents a relative magnitude of coherent and incoherent parts of the tapped light signal 235.

Embodiments measure signal channel OSNR's. The light from an optical fiber 203 is acquired (step 301). The light occupies a predetermined optical bandwidth and is input to the variable bandpass filter 209. The bandpass filter 209 has an Equivalent Rectangular Bandwidth $\Delta f_{eq}$ and is adjusted to select each signal channel's bandwidth from the plurality of signal channels transported in the optical fiber 203 (step 303).

By way of background, the transmitted intensity $I_T$ of a Continuous Wave (CW) light having a frequency f input to an interferometer may be characterized as $$I_T = \frac{I_0}{2}[1 + \cos(2\pi f \tau)], \quad (1)$$

where τ is the time delay between the two paths of the interferometer. Depending on the interferometer delay τ, the transmitted intensity $I_T$ oscillates between $I_0$ corresponding to full transmission of the incident intensity, and zero intensity, corresponding to total reflection of the incident light back to the input source. Those oscillations continue up to very large values of the interferometer delay τ, determined by the coherence time of the source which is at least 1 μs for laser sources.

(1) may be generalized for a modulated light source carrying many frequency components. If each frequency component $f_k$, where k is the index of frequencies occupying the signal channel's bandwidth, has a spectral intensity $I_k$, then the transmitted intensity $I_T$ may be characterized as $$I_T = \frac{1}{2}\sum_k I_k + \frac{1}{2}\sum_k I_k \cos 2\pi f_k \tau. \quad (2)$$

$$\frac{1}{2}\sum_k I_k$$

is half of the total spectral intensity and $$\frac{1}{2}\sum_k I_k \cos 2\pi f_k \tau,$$

viewed as a function of the interferometer delay τ, is half of the real Fourier transform of the spectrum incident on the detector 217. The resultant shape of the interferogram is used to determine the optical intensity spectrum of $I_T$.

Figure 4:
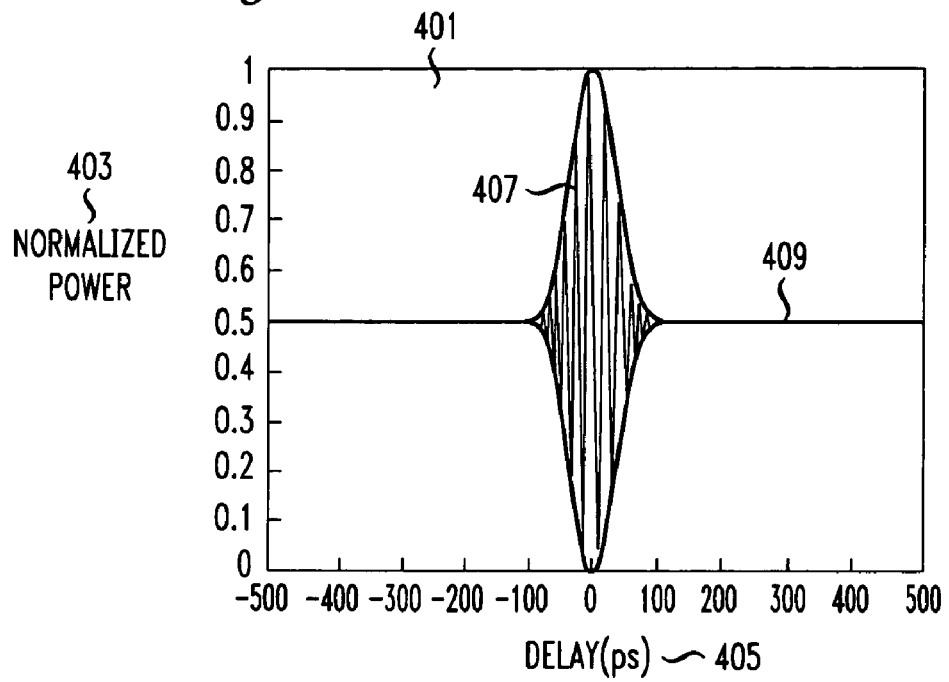
FIG. 4 is an exemplary plot of optical power oscillations as a function of interferometer delay τ.

FIG. 4 shows a plot 401 of normalized intensity in arbitrary units (a.u.) 403 as a function of interferometer delay τ 405. The transmitted intensity $I_T$ has rapid oscillations with the interferometer delay τ at the center frequency $2\pi f_0$, but the oscillatory pattern is confined within a bell-shaped envelope 407 having a bandwidth of about $$\frac{1}{B},$$

where B is the bandwidth represented by a set of frequencies $f_k$. While the envelope shape formed depends on the shape of the incident spectrum, the transmitted intensity $I_T$ in contrast to the monochromatic case, asymptotically approaches a constant level of $$\frac{I_0}{2}$$

409 for large values of interferometer delay τ.

To determine the envelope of a modulated signal is to assume that electric fields are modulated by a slow function of time s(t). Then $$I_T = \frac{I_0}{2}\left[1 + \text{Re}\left[\frac{\langle s^*(t)s(t+\tau)\rangle_t}{\langle s^*(t)s(t)\rangle_t}\exp(i2\pi f \tau)\right]\right], \quad (3)$$

where * is the complex conjugate. In (3), the oscillatory transmitted intensity from (1) is modified by the autocorrelation function of the modulation signal $$s(t) \cdot \frac{\langle s^*(t)s(t+\tau)\rangle_t}{\langle s^*(t)s(t)\rangle_t}$$

yields the envelope of the modulated signal.

In telecommunications systems, digital information is often encoded in optical signal channels by modulating a coherent CW laser light with a sequence of 1's and 0's. The modulation causes spectral broadening of the initial laser frequency. Although a modulated carrier may produce an intensity spectrum that is similar to that of a filtered noise source, its interferogram will, in general, be different. The following considers the most widely-deployed modulation format, non-return-to-zero (NRZ) on-off keying (OOK) modulation. Other digital modulation formats may also be used.

Figure 5:
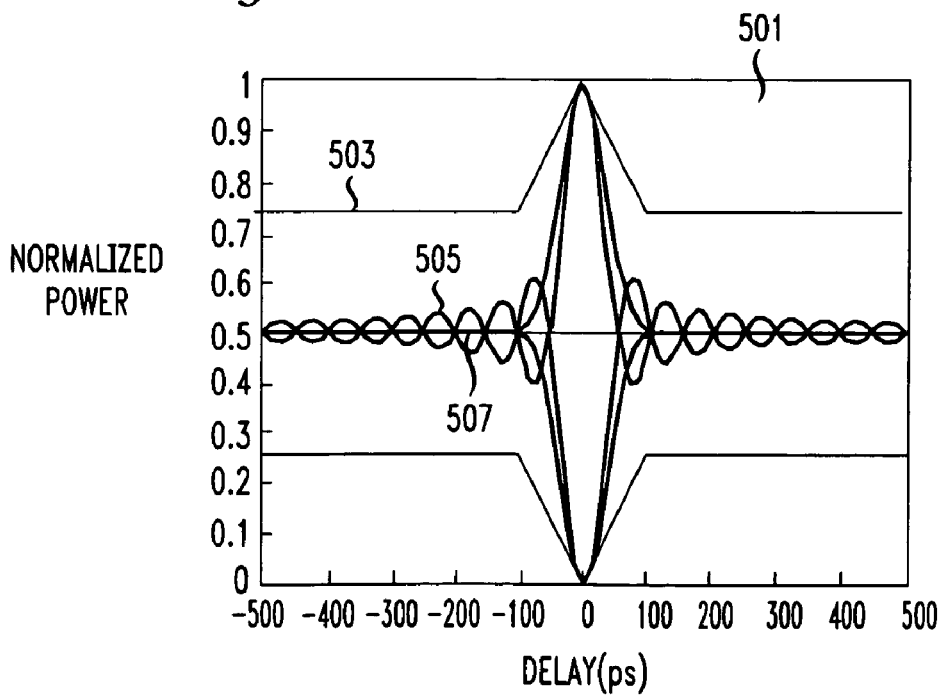
FIG. 5 is an exemplary plot of optical power oscillations and oscillation envelopes as a function of interferometer delay τ for a modulated signal with noise.

Coherent and incoherent signals display different interferogram envelopes. FIG. 5 shows a plot 501 with an envelope 503 for a 10 Gbps signal with NRZ-OOK modulation. For comparison, there is also plotted the interferograms from a 20 GHz wide square spectrum of incoherent light 505 and from an incoherent Gaussian spectrum 507 with a full bandwidth of 14 GHz. Comparison of the two broadband noise interferograms reveals that the sharp edges of the square spectrum give rise to ripples in the interferogram. The key difference between the modulated signal interferogram and both broadband noise interferograms is that the latter two have finite width, while the former continues practically indefinitely, similar to the purely monochromatic case of (1), albeit at a lower level (eventually it will be limited by the coherence time of the laser). The explanation is that various 1's even when separated by more than a bit period in time, are coherent because of the underlying carrier frequency. Therefore, even if the spectra of a modulated signal and incoherent noise may be of a similar width and appear almost identical when observed with a limited spectral resolution, the interferometer 211 can distinguish between the two because of the modulated signal's fundamental coherence.

Figure 6:
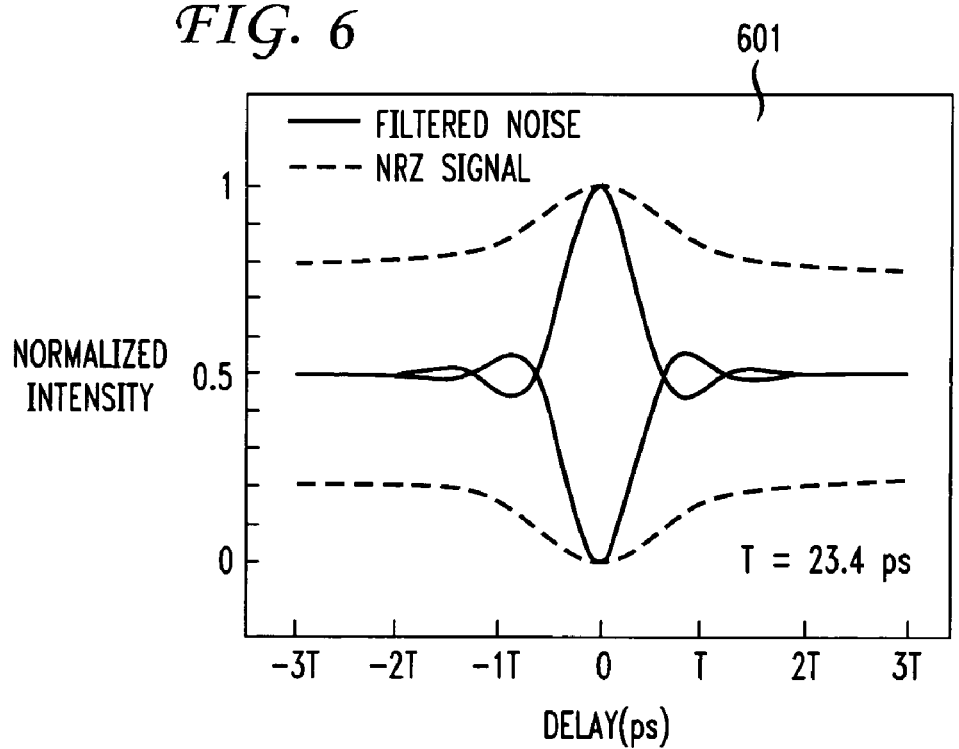
FIG. 6 is an exemplary plot of normalized interferogram envelopes for a modulated signal and for filtered noise.

FIG. 6 shows a plot 601 of two normalized interferogram envelopes. One envelope is for an NRZ modulated signal with no noise and the other is for filtered noise. Due to the coherence of the optical carrier, the signal envelope extends nearly indefinitely, whereas the envelope of noise occupying the same bandwidth rapidly converges as τ increases.

Figure 7:
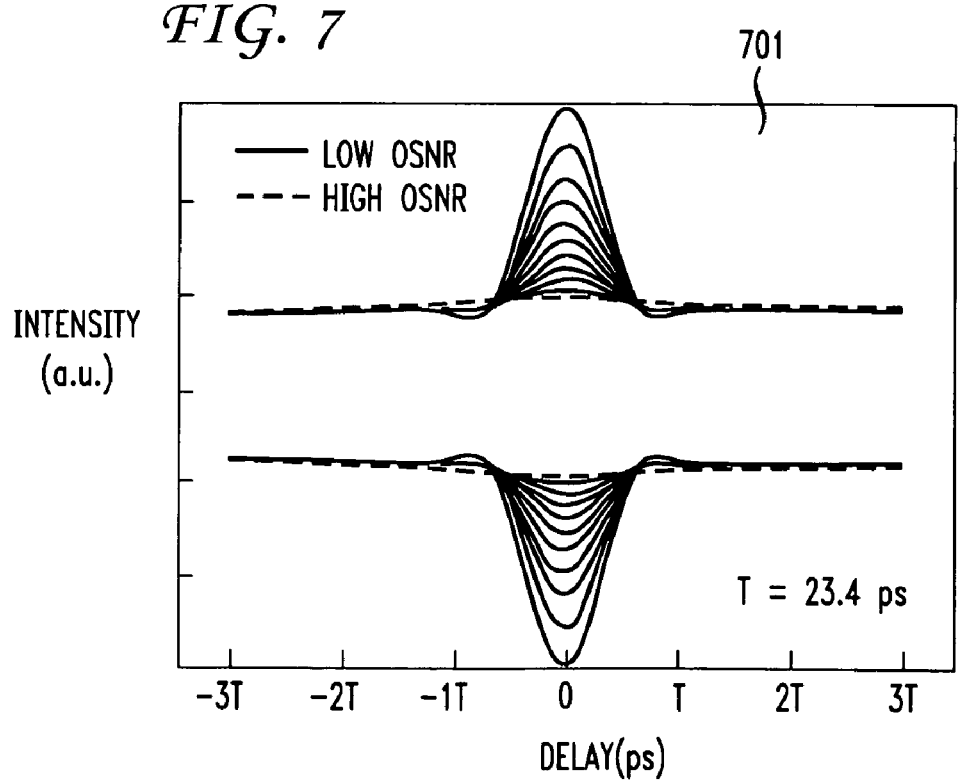
FIG. 7 is an exemplary plot of normalized interferogram envelopes for a constant power modulated signal with increasing noise.

FIG. 7 shows a plot 701 of a series of envelopes corresponding to different magnitudes of noise for the same signal intensity. For large delay values, the signal intensity does not change. If the signal intensity remains constant while noise gradually increases, the noise increase is centered at zero delay. The interferogram wings are only signal intensity.

To calculate a signal channel OSNR, one signal channel from a plurality of signal channels is selected by tuning the variable bandpass filter 209 to that signal channel's center frequency. The signal channel is input to the interferometer 211 (step 303). Embodiments derive and use a calibration factor $\zeta$ $\zeta_{known\ OSNR}$ or $\zeta_{high\ OSNR}$, to compute an OSNR (step 305).

The calibration factor $\zeta$ may be derived using an interferometer 211 in conjunction with or without a power meter or OSA, and with or without a baseline OSNR calibration OSNR$_{cal}$ value (step 307). OSNR$_{cal}$ may be measured using an OSA, or using other available measurement devices or methods (step 309). The calibration factor $\zeta$ may be derived either in the field or elsewhere, for example, at a factory.

Figure 8:
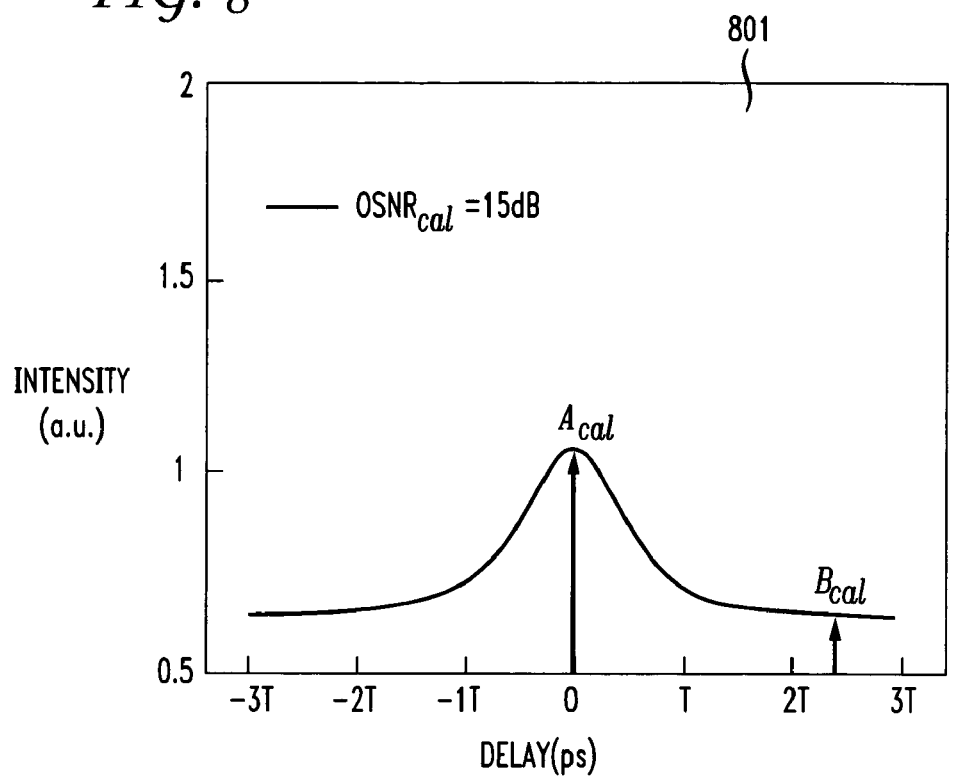
FIG. 8 is an exemplary plot of a normalized interferogram envelope for a modulated signal having a measured $OSNR_{cal}$, showing intensity values $A_{cal}$ and $B_{cal}$ at interferometer delays $\tau_1$ and $\tau_2$.

The interferometer 211 introduces two predetermined time delays $\tau_1, \tau_2$. The first delay $\tau_1$ is zero for measuring the signal channel intensity A$_{cal}$ at zero delay (step 311). FIG. 8 shows a plot 801 with a signal channel having a 15 dB OSNR$_{cal}$. The recombined light beam intensities corresponding to the delay setting τ=0 are captured by the detector 217, conditioned 223 and input to the processor 225 for processing and measurement (steps 313, 315). During processing, the coherent optical signal components are distinguished from the incoherent optical noise components by their intensity measurements, resulting in an interferogram providing the intensity for A$_{cal}$ (step 317).

Alternatively, instead of using the interferometer 211 to measure the intensity at A$_{cal}$, since A$_{cal}$ is at zero delay, a power meter may be substituted for the interferometer (step 311). A measurement of intensity $I_{cal}^{total}$ is taken (step 319). A$_{cal}$ may be calculated using $$A_{cal} = \frac{I_{cal}^{total}}{2} \quad (4)$$

(step 321).

With intensity A$_{cal}$ found, the second interferometer 211 delay $\tau_2$ may be set. The second delay $\tau_2$ finds intensity at B$_{cal}$ which may be a positive delay where $$\tau_2 >> \frac{1}{\Delta f_{eq}} \quad (5)$$

(step 323). FIG. 8 shows B$_{cal}$ located at (5). The recombined light beam intensities corresponding to the delay setting are captured by the detector 217, conditioned 223, and input to the processor 225 for processing and measurement (steps 325, 327).

With intensities A$_{cal}$ and B$_{cal}$ found, a calibration factor $\zeta_{known\ OSNR}$ is calculated using $$\zeta_{known\ OSNR} = \frac{I_{env}^{cal}(\tau_{wing}) - 0.5 \times I_{env}^{cal}(0)}{0.5 \times I_{env}^{cal}(0)} \times \quad (6)$$

$$\left[1 + \frac{\Delta f_{eq}}{12.5\ \text{GHz}} \times 10^{-\left(\frac{OSNR_{cal}}{10}\right)}\right], \text{or}$$

$$= \frac{B_{cal}}{A_{cal}} \times \left[1 + \frac{\Delta f_{eq}}{12.5\ \text{GHz}} \times 10^{-\left(\frac{OSNR_{cal}}{10}\right)}\right],$$

where $\Delta f_{eq}$ is the equivalent rectangular bandwidth of the bandpass filter, OSNR$_{cal}$ is the OSNR reference value, and for high values of OSNR$_{cal}$, $$\left[1 + \frac{\Delta f_{eq}}{12.5\ \text{GHz}} \times 10^{-\left(\frac{OSNR_{cal}}{10}\right)}\right]$$

approaches 1. (step 329).

Using the calibration factor $\zeta_{known\ OSNR}$, an OSNR for the signal channel may be calculated $$OSNR = \frac{B}{A \times \zeta - B} \quad (7)$$

(step 331).

Figure 9:
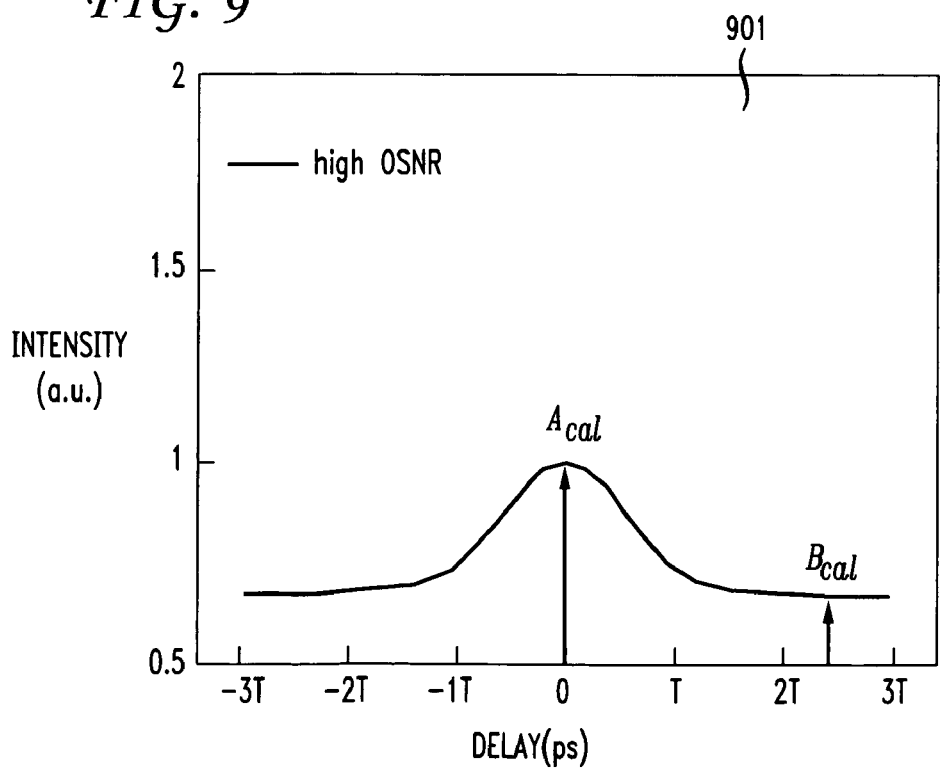
FIG. 9 is an exemplary plot of a normalized interferogram envelope for a modulated signal having a high OSNR, showing intensity values $A_{cal}$ and $B_{cal}$ at interferometer delays $\tau_1$ and $\tau_2$.

If a reference $OSNR_{cal}$ cannot be acquired (step 307), a calibration factor $\zeta_{high\ OSNR}$ may be derived if the anticipated signal channel's OSNR value is sufficiently high $$OSNR_{cal} \gg 10 \times \log_{10}\left[\frac{\Delta f_{eq}}{12.5\ \text{GHz}}\right], \quad (8)$$

where $$\frac{\Delta f_{eq}}{12.5\ \text{GHz}}$$

is the fraction of noise power that fits within a 0.1 nm bandwidth (step 333). If the signal channel's OSNR is high, a calibration factor $\zeta_{high\ OSNR}$ may be derived. FIG. 9 shows a plot 901 of a signal channel having a high OSNR. If the signal channel's OSNR value does not satisfy (8), a calibration factor $\zeta$ cannot be derived and the method terminates.

As described above, the interferometer 211 introduces two predetermined time delays $\tau_1, \tau_2$. The first delay $\tau_1$ is zero for measuring an intensity at $A_{cal}$ at zero delay (step 335). The recombined light beam intensities corresponding to the delay setting $\tau=0$ are captured by the detector 217, conditioned 223 and input to the processor 225 for processing and measurement (steps 337, 339). During processing, the coherent optical signal components are distinguished from the incoherent optical noise components by their intensity measurements resulting in an interferogram providing the intensity at $A_{cal}$ (step 341).

Alternatively, instead of using the interferometer 211 to measure the intensity at $A_{cal}$, since $A_{cal}$ is at zero delay, a power meter may be substituted for the interferometer (step 335). A measure of total intensity $I_{cal}^{total}$ is taken at zero delay (step 343). $A_{cal}$ may be calculated using (4) (step 345).

With $A_{cal}$ found, the second interferometer 211 delay $\tau_2$ may be set. The second delay $\tau_2$ finds intensity at $B_{cal}$ which may be at a positive delay corresponding to (5) (step 347). FIG. 9 shows $B_{cal}$ located at (5). The recombined light beam intensities corresponding to the delay setting are captured by the detector 217, conditioned 223, and input to the processor 225 for processing and measurement (steps 349, 351).

With intensities $A_{cal}$ and $B_{cal}$ found, a calibration factor $\zeta_{high\ OSNR}$ is calculated using $$\zeta_{high\ OSNR} = \frac{B_{cal}}{A_{cal}} = \frac{I_{env}^{cal}(\tau_{wing}) - 0.5 \times I_{env}^{cal}(0)}{0.5 \times I_{env}^{cal}(0)}, \quad (9)$$

(step 353). Using the calibration factor $\zeta_{high\ OSNR}$, an OSNR may be calculated using (7) (step 331).

After the calibration factor $\zeta_{high\ OSNR}$ for a particular signal channel is calculated (step 305), it may be used thereafter to provide subsequent OSNR's for that signal channel.

As above, the interferometer 211 introduces two predetermined time delays $\tau_1, \tau_2$. The first delay $\tau_1$ is zero for measuring an intensity $A_{cal}$ at zero delay (step 355). The recombined light beam intensities corresponding to the delay setting $\tau=0$ are captured by the detector 217, conditioned 223 and input to the processor 225 for processing and measurement (steps 357, 359, 361).

Alternatively, instead of using the interferometer 211 to measure the intensity at $A_{cal}$, since $A_{cal}$ is at zero delay, a power meter may be substituted for the interferometer (step 355). A measure of total intensity $I_{cal}^{total}$ is taken at zero delay (step 363). $A_{cal}$ may be calculated using (4) (step 365).

With $A_{cal}$ found, the second interferometer 211 delay $\tau_2$ may be set. The second delay $\tau_2$ finds intensity at $B_{cal}$ which may be a positive delay corresponding to (5) (step 367). The recombined light beam intensities corresponding to the delay setting are captured by the detector 217, conditioned 223, and input to the processor 225 for processing and measurement (steps 369, 371).

Using the previously derived calibration factor $\zeta$ ($\zeta_{known\ OSNR}$ or $\zeta_{high\ OSNR}$) for that signal channel, its OSNR can be calculated (step 331) with 0.6 dB accuracy over a 5 to 25 dB range. Calibration uncertainties of about 1% arising from thermal drifts produce OSNR errors of 1 to 2 dB over the smaller range of 5 to 20 dB OSNR.

One or more embodiments of the present invention have been described. Nevertheless, it will be understood that various modifications may be made without departing from the spirit and scope of the invention. Accordingly, other embodiments are within the scope of the following claims.

What is claimed is:

1. A method for deriving an optical signal-to-noise ratio (OSNR) calibration factor $\zeta$ for an optical signal channel having an equivalent bandwidth of $\Delta f_{eq}$ comprising:

inputting the optical signal channel into an optical spectrum analyzer and measuring a calibrated $OSNR_{cal}$ for the optical signal channel;

inputting the optical signal channel into an interferometer comprising:

adjusting a time delay $\tau$ of the interferometer to a first delay $\tau_1$, wherein the first delay $\tau_1$ is zero;

measuring an intensity $A_{cal}$ at $\tau_1$;

adjusting the interferometer time delay $\tau$ to a second delay $\tau_2$, wherein the second delay $\tau_2$ is much greater than the reciprocal of the optical signal channel's equivalent bandwidth $\Delta f_{eq}$;

measuring an intensity $B_{cal}$ at $\tau_2$; and calculating the calibration factor $\zeta_{known\ OSNR}$ using the calibrated $OSNR_{cal}$ and the intensities $A_{cal}$ and $B_{cal}$ wherein the calibration factor $\zeta_{known\ OSNR}$ equals $$\frac{B_{cal}}{A_{cal}} \times \left[1 + \frac{\Delta f_{eq}}{12.5\ \text{GHz}} \times 10^{-\left(\frac{OSNR_{cal}}{10}\right)}\right].$$

2. The method according to claim 1 wherein the calibrated $OSNR_{cal}$ and the measured interferometer intensities $A_{cal}$ and $B_{cal}$ are taken under the same optical signal channel conditions.

3. A method for deriving an optical signal-to-noise ratio (OSNR) calibration factor $\zeta$ for an optical signal channel having an equivalent bandwidth of $\Delta f_{eq}$ comprising:

inputting the optical signal channel into an interferometer comprising:

adjusting a time delay $\tau$ of the interferometer to a first delay $\tau_1$, wherein the first delay $\tau_1$ is zero;

measuring an intensity $A_{cal}$ at $\tau_1$;

adjusting the interferometer time delay $\tau$ to a second delay $\tau_2$, wherein the second delay $\tau_2$ is much greater than the reciprocal of the optical signal channel's equivalent bandwidth $\Delta f_{eq}$;

measuring an intensity $B_{cal}$ at $\tau_2$; and calculating the calibration factor $\zeta_{high\ OSNR}$ using the intensities $A_{cal}$ and $B_{cal}$, wherein the calibration factor $\zeta_{high\ OSNR}$ equals $$\frac{B_{cal}}{A_{cal}}$$

if the optical signal channel's anticipated OSNR is much greater than $$10 \times \log_{10}\left[\frac{\Delta f_{eq}}{12.5\ \text{GHz}}\right].$$

4. The method according to claim 3 wherein the measured interferometer intensities $A_{cal}$ and $B_{cal}$ are taken under the same optical signal channel conditions.

* * * * *